J. F. O'CONNOR.
FRICTION DRAFT RIGGING.
APPLICATION FILED FEB. 25, 1911.
992,442.
Patented May 16, 1911.
2 SHEETS—SHEET 1.
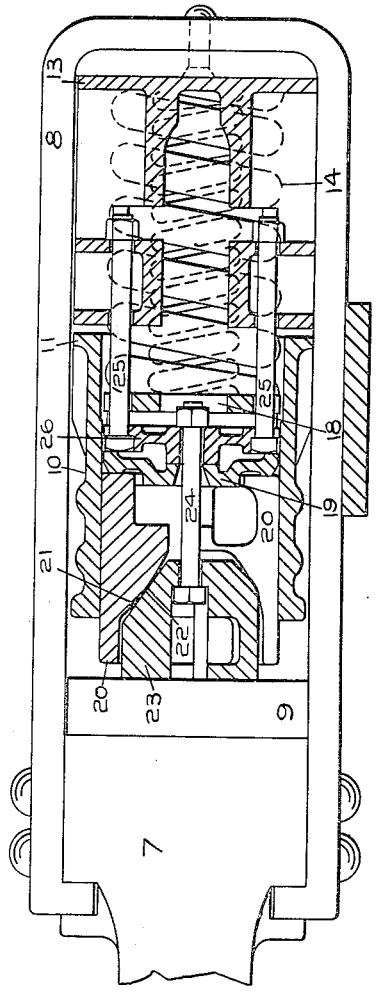
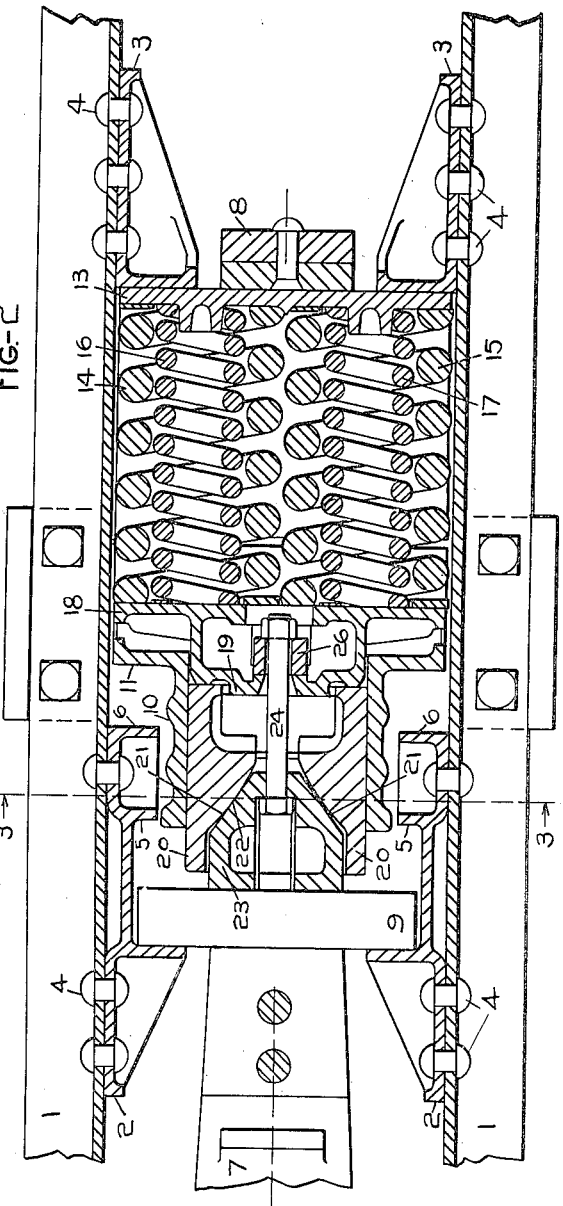
WITNESSES:
Calvin B. Patch
A. M. Munday
INVENTOR
John F. O'Connor.
Munday, Evarts, Adcock & Clark
BY
HIS ATTORNEYS.

J. F. O'CONNOR.
FRICTION DRAFT RIGGING.
APPLICATION FILED FEB. 25, 1911.
992,442.
Patented May 16, 1911.
2 SHEETS—SHEET 2.
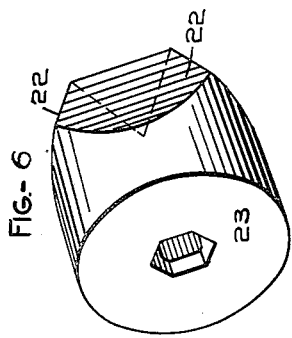
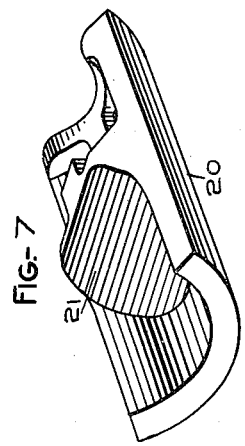
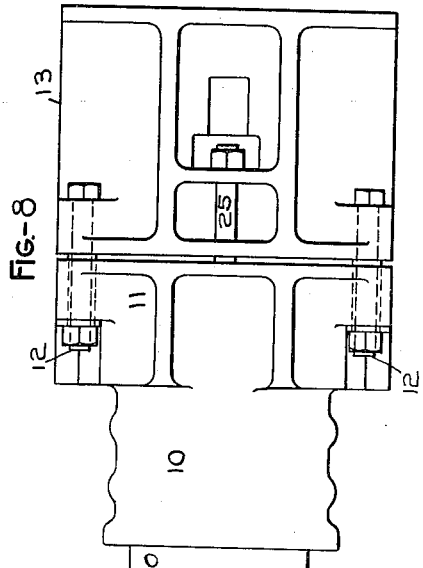
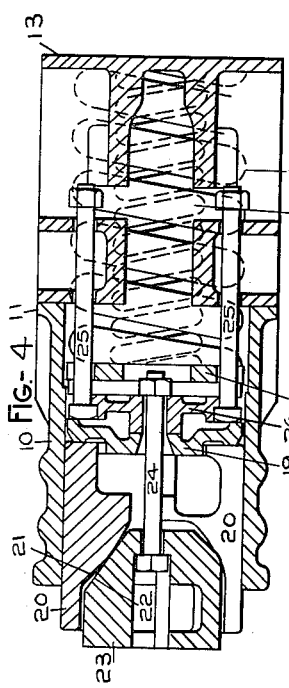
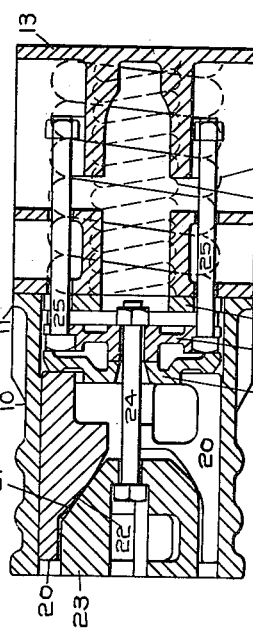
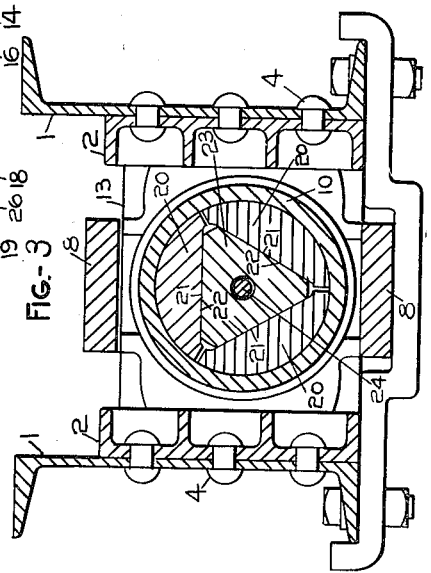
WITNESSES:
Calvin B. Patch
N. W. Munday
INVENTOR
John F. O'Connor
BY Munday, Evarts, Adcock & Clarke
HIS ATTORNEYS

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

992,442.      Specification of Letters Patent.      Patented May 16, 1911.

Application filed February 25, 1911. Serial No. 610,702.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.
The object of my invention is to provide a friction draft rigging which will be of a strong, simple, efficient and durable construction, which will release certainly and at the same time afford a relatively high cushioning capacity.

To practically accomplish this object or result, and herein my invention consists, I combine twin springs with the friction shell, friction shoes and wedge, and provide convexly curved wedging or inclined faces between the friction shoes and wedge (the convexly curved faces being preferably on the friction shoes instead of upon the wedge,); so that the wedge will have a central bearing against the friction shoes and so that also the release action of the friction mechanism will be also facilitated thereby.

In the accompanying drawing forming a part of this specification, Figure 1 is a central longitudinal section of a friction draft rigging embodying my invention; Fig. 2 is a plan view partly in horizontal section; Fig. 3 is a cross section on line 3—3 of Fig. 2; Fig. 4 is a detail longitudinal section similar to Fig. 1, but showing the spring partially compressed. Fig. 5 is a similar view to Fig. 2 showing the spring fully compressed; Fig. 6 is a detail perspective view of the wedge and Fig. 7 is a detail perspective view of one of the friction shoes and Fig. 8 is a plan view of the friction shell and spring cage.

In the drawing, 1 represents the center sills or draft members of the car frame to which the draft lugs or stop members 2, 3 are secured by rivets 4 in the usual manner. The front stop members 2 have limiting stop shoulders 5, 6. The draw bar 7 is furnished with the usual draft yoke 8 and abuts against the front follower 9. The longitudinally movable friction shell 10 has a rectangular enlargement 11 at its rear end connected by bolts 12 with the twin spring cage 13 against which the twin springs 14, 15 react at their rear ends. Smaller springs 16, 17 are nested within the main springs 14, 15. A twin spring seat 18 having a central boss or bearing 19 for engagement with the friction shoes 20 is interposed between the twin springs and the friction shoes. The friction shoes 20 which are made of hardened steel are preferably 3 in number. Each is furnished with a convexly curved inclined or wedging face 21 for engagement with the coacting wedging face 22 of the wedge 23 which is also of hardened steel and furnished with three wedge faces, or one for each friction shoe. The wedge 23 is connected to the spring cage 13 by connecting bolts 24 and 25, 25, through the interposed bridge member 26. The convexly curved wedge faces 21 of the friction shoes which engage the straight wedge faces 22 of the wedge 23 give the wedge a central bearing against the friction shoes, also a bearing of limited area, and thus causes the friction shoes to have an even bearing and pressure from end to end of the shoes against the friction shell, and also serves to materially facilitate the release action of the friction mechanism. The twin springs which react at their front end against the friction shoes through the interposed twin spring seat member 18 and at their rear end against the friction shell 10 through the spring cage 13 and connecting bolts 12 coact together when compressed to restore the friction shoes from the position shown in Fig. 5 to the position shown in Figs. 1 and 2 and thus insure a certain and reliable release action. As both of the twin or side by side arranged springs coöperate together to effect the release action the wedge 23 may be made sufficiently acute to give the gear a relatively high cushioning capacity without interfering with the release action of the friction mechanism since the convexly curved wedge faces of the shoes also coöperate to facilitate the release action.

I claim:—

1. In a friction draft rigging the combination with a friction shell and spring, of a wedge having inclined faces and friction shoes having convexly curved inclined faces for contacting with the inclined faces of the wedge, substantially as specified.

2. In a friction draft rigging, the combination with a friction shell and twin springs arranged side by side, of a twin spring cage connected to said friction shell, a wedge having inclined faces and friction shoes having convexly curved inclined faces for contacting with the inclined faces of the wedge, and a twin spring seat interposed between said twin springs and said friction shoes, substantially as specified.

3. In a friction draft rigging, the combination with a friction shell and spring, of a wedge member and a friction shoe member comprising a plurality of friction shoes, both of said members having inclined faces and one of said members having its inclined faces convexly curved for contacting with the inclined faces of the other member, substantially as specified.

JOHN F. O'CONNOR.

Witnesses:
F. SEYMOUR CLARK,
M. GRACE RAPP.